US009598607B2

(12) United States Patent
Komarova et al.

(10) Patent No.: US 9,598,607 B2
(45) Date of Patent: Mar. 21, 2017

(54) VOC-FREE, LOW VISCOSITY, LED-CURABLE COATING AND METHOD OF APPLICATION

(71) Applicant: Kegel, LLC, Lake Wales, FL (US)

(72) Inventors: Elena Y. Komarova, Stokesdale, NC (US); Dennis Sheirs, Sebring, FL (US); Brandy Padilla, Winter Haven, FL (US); Donald Wall, Sebring, FL (US)

(73) Assignee: Kegel, LLC, Lake Wales, FL (US)

( * ) Notice: Subject to any disclaimer, the term of this patent is extended or adjusted under 35 U.S.C. 154(b) by 0 days.

(21) Appl. No.: 13/771,762

(22) Filed: Feb. 20, 2013

(65) Prior Publication Data

US 2013/0216838 A1   Aug. 22, 2013

Related U.S. Application Data

(60) Provisional application No. 61/601,353, filed on Feb. 21, 2012.

(51) Int. Cl.
| | |
|---|---|
| C09D 4/06 | (2006.01) |
| C09D 163/00 | (2006.01) |
| C09D 181/02 | (2006.01) |
| C09D 147/00 | (2006.01) |
| C09D 137/00 | (2006.01) |
| C09D 175/16 | (2006.01) |
| C09D 133/08 | (2006.01) |
| C09D 163/10 | (2006.01) |
| C08F 220/10 | (2006.01) |
| C09D 175/14 | (2006.01) |
| C08G 75/04 | (2016.01) |

(52) U.S. Cl.
CPC .......... C09D 175/14 (2013.01); C08F 220/10 (2013.01); C08G 75/045 (2013.01); C09D 4/06 (2013.01); C09D 133/08 (2013.01); C09D 137/00 (2013.01); C09D 147/00 (2013.01); C09D 163/00 (2013.01); C09D 163/10 (2013.01); C09D 175/16 (2013.01); C09D 181/02 (2013.01); Y10T 428/31504 (2015.04); Y10T 428/31551 (2015.04); Y10T 428/31696 (2015.04); Y10T 428/31931 (2015.04)

(58) Field of Classification Search
None
See application file for complete search history.

(56) References Cited

U.S. PATENT DOCUMENTS

| | | | |
|---|---|---|---|
| 4,070,262 | A | 1/1978 | Guarino et al. |
| 4,146,452 | A | 3/1979 | Weber et al. |
| 5,318,808 | A | 6/1994 | Crivello et al. |
| 5,453,451 | A | 9/1995 | Sokol |
| 6,387,981 | B1 * | 5/2002 | Zhang .................. A61K 6/0017 522/81 |
| 7,151,123 | B2 | 12/2006 | Ramsey |
| 2005/0222295 | A1 | 10/2005 | Siegel |
| 2005/0234145 | A1 | 10/2005 | Sitzmann et al. |
| 2006/0194894 | A1 | 8/2006 | Kovar et al. |
| 2007/0021523 | A1 | 1/2007 | Treadway |
| 2007/0295446 | A1 * | 12/2007 | Behr et al. .................. 156/275.7 |
| 2010/0276059 | A1 | 11/2010 | Tian et al. |
| 2010/0279026 | A1 | 11/2010 | Treadway |
| 2010/0285282 | A1 | 11/2010 | Selman et al. |
| 2011/0023717 | A1 * | 2/2011 | Itami .................... B01D 53/228 96/11 |
| 2012/0021134 | A1 | 1/2012 | Kolb et al. |
| 2013/0224495 | A1 | 8/2013 | Gan et al. |

FOREIGN PATENT DOCUMENTS

| | | |
|---|---|---|
| JP | 2007-532739 | 11/2007 |
| WO | 2011/084554 A1 | 7/2011 |
| WO | 2012/006199 A1 | 1/2012 |

OTHER PUBLICATIONS

USBC Equipment Specifications and Certifications Manual, May 2012, Bowl.com, 54 pages.
Cytec Technical Data Sheet EBECRYL® P115 Copolymerizable Amine, Sep. 13, 2011, 2011 Cytec Industries Inc., www.cytec.com, 1 page.
BYK Additives & Instruments Data Sheet S212, Issue Jul. 2008, BYK-Chemie GmbH, www.byk.com/additives, 4 pages.
Sartomer Technical Data Sheet: CD9053, Trifunctional Acid Ester, Jul. 2011, Sartomer USA, LLC, www.sartomer.com, 1 page.
Sartomer technical data sheet: CN9890, Melamine Acrylate, Jul. 2011, Sartomer USA, LLC, www.sartomer.com, 1 page.
Tego® Flow 370, flow and leveling additive, Oct. 2010, Evonik Tego Chemie GmbH, www.tego.de, 1 page.
Nanoresins Technical data sheet, Nanocryl C 140, Aug. 2007, hanse chemie USA, Inc., www.hansechenn.com, 1 page.
Sartomer product bulletin: SR306F, Tripropylene Glycol Diacrylate, Aug. 2011, Sartomer USA, LLC, www.sartomer.com, 1 page.
Sartomer product bulletin: SR399LV, Low Viscosity Dipentaerythritol Pentaacrylate, Jul. 2011, Sartomer USA, LLC, www.sartomer.com, 1 page.
Sartomer product bulletin: SR238B, 1,6 Hexanediol Diacrylate, Aug. 2011, Sartomer USA, LLC, www.sartomer.com, 1 page.
Ciba Specialty Chemicals Coating Effects Segment, Ciba® EFKA® 3883, Mar. 5, 2007, 2005 Ciba Specialty Chemicals Inc., 2 pages.
Sartomer Technical Data Sheet: CD595, Acrylate Ester, Jul. 2011, Sartomer USA, LLC, www.sartomer.com, 1 page.

(Continued)

*Primary Examiner* — Sheeba Ahmed
(74) *Attorney, Agent, or Firm* — Hovey Williams LLP

(57) ABSTRACT

This invention is related to compositions that can be used to protect surfaces, such as those found on bowling lanes (both synthetic and wood). The compositions are low viscosity and contain little to no VOCs (volatile organic compounds). In one embodiment, the flowable compositions are 100% solids, while in another embodiment, they are solvent-borne compositions that only include VOC-exempt solvents. Regardless of the embodiment, the compositions can be cured via UV LED light to yield scratch, abrasion, and impact resistant coatings.

38 Claims, No Drawings

(56) References Cited

OTHER PUBLICATIONS

Thiocure* TMPMP Trimethylolpropane Tri-3-Mercaptopropionate Sales Specifications, Dec. 3, 2007, Evans Chemetics LP, 2 pages.
Chitec® Product Data Sheet Chivacure® TPO, Photoinitiator for UV coatings, Apr. 20, 2005, www.chitec.com, 2 pages.
Sartomer Technical Data Sheet: CN112C60, Epoxy Novolak Acrylate Blended with SR351, Jul. 2011, Sartomer USA, LLC, www.sartomer.com, 1 page.
Sartomer product bulletin: SR-444, Pentaerythritol Triacrylate, Jul. 2011, Sartomer USA, LLC, www.sartomer.com, 1 page.
Sartomer product bulletin: SR9003 B, Propoxylated(2) Neopentyl Glycol Diacrylate, Aug. 2011, Sartomer USA, LLC, www.sartomer.com, 1 page.
Masurf® FS-2000 Fluoroaliphatic Polymer Fluorosurfactant, Mason Chemical Company, 2 pages.
Cytec Technical Data Sheet UCECOAT® 7710 UV Curable Polyurethane Dispersion, Jul. 30, 2010, 2010 Cytec Industries Inc., www.cytec.com, 2 pages.
Cytec Technical Data Sheet UCECOAT® 7699 Acrylated Polyurethane Dispersion, Sep. 16, 2009, 2009 Cytec Industries Inc., www.cytec.com, 1 page.
DuPontTM CapstoneTM 62-AL Intermediate Technical Information, May 2009, DuPont, 1 page.
MichelmanTechnical Data Sheet Michem® Lube 190, Dec. 15, 2009, www.michelman.com, 4 pages.
Cytec Surface Specialties Technical Datasheet® BECKOPOX EP 147w, Oct. 1, 2006, 2 pages.
Chartwell C-515.71HR Technical Data, Sep. 2007, Chartwell International, Inc., www.chartwellintl.com, 1 page.
CVC Thermoset Specialties Technical Bulletin ERISYS TM GE-30 Trimethylolpropane Triglycidyl Ether CAS No. 30499-70-8, Nov. 24, 2008, CVC Thermoset Specialties, www.emeraldmaterials.com, 4 pages.
CVC Thermoset Specialties Technical Bulletin ERISYS TM GE-31 Trimethylolethane Triglycidyl Ether Aliphatic Trifunctional Epoxy Diluent CAS No. 68460-21-9, EINECS—Polymer (Monomers Listed), Dec. 22, 2008, CVC Thermoset Specialties, www.emeraldmaterials.com, 4 pages.
CVC Thermoset Specialties Technical Bulletin ERISYS TM GE-60 Sorbitol Glycidyl Ether—Aliphatic Polyfunctional Epoxy Resin CAS No. 68412-01-1, Nov. 24, 2008, CVC Thermoset Specialties, www.emeraldmaterials.com, 2 pages.
Bayer MaterialScience BAYHYDROL® UV 2689/1 XP Anionic Polyurethane Dispersion, Jul. 2012, Bayer MaterialScience LLC, www.bayermaterialsciencenafta.com, 2 pages.
NANOCRYL® C 145 Special product properties, silica nanocomposite, Dec. 2012, Evonik Industries AG, www.tego.de, 1 page.
NANOCRYL® C 150 Special product properties, silica nanocomposite, Dec. 2012, Evonik Industries AG, www.tego.de, 1 page.
NANOCRYL® C 165 Special product properties, silica nanocomposite, Dec. 2012, Evonik Industries AG, www.tego.de, 1 page.
Nanopox® C 680, Supplier: Evonik, Product performance, 1 page.
Micro Powders, Inc. Technical Data Sheet Polyfluo 523XF, Nov. 1996, 1 page.
Sartomer Technical Data Sheet: SR454, Ethoxylated (3) Trimethylolpropane Triacrylate, Jul. 2011, Sartomer USA, LLC, www.sartomer.com, 1 page.
Sartomer Technical Data Sheet: CD9054, Trifunctional Acid Ester, Jul. 2011, Sartomer USA, LLC, www.sartomer.com, 1 page.
Murray, Patrick, "Enhanced Scratch-Resistance of Clear Coats Using Nano-Aluminum Oxide Additives," Nanophase Technologies Corporation, Sep. 21, 2011, 34 pages.
Syna-Pl 6976, ginray.com, 1 page.
Irgacure® 819, Supplier: Ciba, now part of BASF, Product performance, 1 page.
International Search Report and Written Opinion dated Jun. 24, 2013 in corresponding PCT/US2013/026871 filed on Feb. 20, 2013.
International Preliminary Report on Patentability dated Jun. 20, 2014 in corresponding PCT/US2013/026871 filed on Feb. 20, 2013.

* cited by examiner

VOC-FREE, LOW VISCOSITY, LED-CURABLE COATING AND METHOD OF APPLICATION

RELATED APPLICATIONS

The present application claims the priority benefit of U.S. Provisional Patent Application Ser. No. 61/601,353, filed Feb. 21, 2012, entitled VOC-FREE LOW VISCOSITY LED CURABLE COATING AND METHOD OF APPLICATION, incorporated by reference in its entirety herein.

BACKGROUND OF THE INVENTION

Field of the Invention

The present invention is broadly concerned with VOC-free protective coatings that can be used to protect surfaces, such as those on bowling lanes.

Description of the Prior Art

Protective coatings are utilized in many products, including furniture, appliances and other electrical devices, floors, automotive exterior paint, and automotive interior parts. The coating usually protects plastic, metal, and wooden surfaces from being scratched as well as from other damage. The coating also conceals some of the underlying surface imperfections, makes the surface look smoother, and gives a glossier or more matte finish depending on the desired final product look.

Many types of coatings have been developed over the years, including two-part, ambient cure, and radiation curable types. A two-part is a coating that must be mixed with a hardener in order to be cured. An ambient cure coating is a coating where either solvent evaporation or moisture solidifies the coating. Radiation curable coatings include both ultraviolet (UV) light and electron beam (EB) curable coatings and cure by initiating reactions via irradiation. UV light is an electromagnetic radiation with a wavelength shorter than visible light wavelength. When the term UV light is applied to radiation curable conventional coatings, the wavelength of UV light is in the region of 100 nm through 400 nm.

Since their development, radiation curable coatings have gained acceptance due to their almost immediate cure or very short cure times, minimal oven use, and ability to be applied onto thermally unstable substrates. In order to cure common radiation curable coatings, UV mercury vapor lamps, which can be arc or microwave powered, are utilized. These lamps emit radiation in UVA, UVB, and UVC regions of the electromagnetic spectrum. This radiation is useful in the coating cure process. Besides UV radiation, these lamps produce a large quantities of infrared (IR) radiation (heat) as well as ozone.

A new field in radiation cured coatings that is emerging now is light emitting diode (LED) curable coatings. There are many advantages to using LED light sources over conventional UV mercury lamps. Some of the important advantages include that LEDs require much less power to run, they are instant on/off light sources, and there is no need for bulky cooling systems. In addition, LEDs have a much longer life compared to mercury vapor lamps. Moreover, current commercially available UV LEDs generate neither ozone nor excessive heat that may damage the coating being cured. Current commercially used UV LEDs emit radiation in the close to visible part of UVA (320-400 nm) and visible portion (400-700 nm) of the spectrum.

High energy UV radiation such as UVC (100-290 nm) is required to effectively cure standard UV coatings that react through free radical mechanisms such as various acrylate coatings in ambient conditions. Ambient conditions herein are defined as the presence of oxygen at concentrations that are equal to or above 20% by volume, which can be translated into 18 kPa oxygen partial pressure. In these conditions, most of the existing free-radical UV curable coating will not be sufficiently cured under UVA LED light even if UVA absorbing initiators are applied. The surface of the coating does not completely cure, i.e., it remains tacky after UVA exposure due to oxygen inhibition. The practice to apply a nitrogen blanket in order to properly cure these UV coating compositions is customary even when mercury vapor UV lamps are utilized. This is true especially if high scratch or abrasion resistance is required.

Coatings that cure through a cationic polymerization route such as those bearing epoxy functionality do not have the downside of the aforementioned property. Most of the commercially available cationic photoinitiators do not efficiently absorb light in UVA region. The addition of a UVA photosensitizer solves that problem. Therefore, the development of UV LED epoxy coatings looks like a promising path. Unfortunately, the shortcomings of this route include the yellow/brownish color of the resulting UV-cured epoxy coating, and reduced selection (if compared to available free radical) of low molecular weight highly crosslinkable monomers that are not viscous in order to formulate a 100% solids coating. The Environmental protection agency (EPA) VOC regulations are getting more strict each year, especially for indoor coatings and finishes. Therefore, the need exists for a 100% solids or water-based coating that can be cured in ambient conditions with UV LED light.

SUMMARY OF THE INVENTION

The present provides a flowable composition useful for treating a surface. The flowable composition is selected from the group consisting of:
(1) a metal oxide composition comprising:
   silica nanoparticles, alumina nanoparticles, or both;
   an acrylate; and
   a photoinitiator;
(2) a hybrid composition comprising free radical polymerizable monomers, cationic polymerizable monomers, and a photoinitiator; and
(3) a polymeric composition comprising a polymer and a photoinitiator dissolved or dispersed in a solvent system, said polymer being selected from the group consisting of epoxies, polyurethanes, acrylates, and mixtures thereof.

The flowable composition has a viscosity of less than about 200 cP, comprises less than about 5% by weight volatile organic compounds, and is curable by light having a wavelength of from about 320 nm to about 700 nm, and more preferably curable by an LED light source.

The invention is further concerned with a method of forming a coating on a surface. The method involves applying the above flowable composition to the surface. The layer is then exposed to light having a wavelength of from about 320 nm to about 700 nm to form the coating, and more particularly to light from an LED light source.

In a further embodiment, the invention provides a protected surface, which comprises a cured coating on the surface to be protected. The cured coating is formed from the above flowable composition.

DETAILED DESCRIPTION OF THE PREFERRED EMBODIMENTS

In more detail, the flowable composition is provided in three embodiments. In the first embodiment, the flowable composition is a metal oxide-containing composition, and it comprises silica and/or alumina nanoparticles, an acrylate (or multiple different types of acrylates), and a photoinitiator. This embodiment is preferably mostly or entirely solids. That is, the composition comprises at least about 95% by weight solids, preferably at least about 98% by weight solids, and more preferably about 100% by weight solids, based upon the total weight of the composition taken as 100% by weight.

Suitable silica and alumina nanoparticles include any commercially available ones, with some specific ones shown in the Examples below. (The Examples also include exemplary commercial products for the other components of this embodiment and the other embodiments as well.) The nanoparticles preferably have a particle size of from about 10 nm to about 800 nm, and preferably from about 20 nm to about 250 nm, and are typically provided dispersed in epoxy monomers, acrylate monomers or resins, and a solvent at a level of from about 1% to about 50% by weight. The silica and/or alumina nanoparticles are present in the overall composition at levels of from about 1% by weight to about 50% by weight, preferably from about 2% by weight to about 45% by weight, and more preferably from about 25% by weight to about 45% by weight, based upon the total weight of the composition taken as 100% by weight.

Suitable acrylates and other free radical polymerizable monomers ("FRPM") include those selected from the group consisting of aliphatic urethane acrylates, epoxy acrylates, melamine acrylates, monofunctional acrylates, methacrylates, ethylenically unsaturated monomers and resins, and multifunctional acrylates (difunctional acrylates). Particularly preferred acrylates are selected from the group consisting of acrylate esters, trimethylol propane triacrylate, 1,6-hexanediol acrylate, 1,6-hexanediol diacrylate, isobornyl acrylate, hexafunctional urethane acrylate, hexafunctional epoxy acrylate, tripropylene glycol diacrylate, epoxy novolak acrylate, ethoxylated trimethylolpropane triacrylate, pentaerythritol triacrylate, dipentaerythritol pentaacrylate, melamine acrylate, propoxylated neopentyl glycol diacrylate, and mixtures thereof.

The acrylates are present in the composition at levels of from about 20% by weight to about 80% by weight, preferably from about 30% by weight to about 70% by weight, and more preferably from about 45% by weight to about 65% by weight, based upon the total weight of the composition taken as 100% by weight.

Suitable photoinitiators include those selected from the group consisting of 2,4,6-trimethylbenzoyldiphenylphosphine oxide, his (2,4,6-trimethylbenzoyl)-phenylphosphineoxide, 4-thiophenyl phenyl diphenyl sulfonium hexafluoroantimonate, 2-methyl-1-[4-(methylthio)-phenyl]-2-(4-morpholinyl)-1-propanone, other phosphine oxide-based photoinitiators, and mixtures thereof. The photoinitiators are present in the composition at levels of from about 1% by weight to about 10% by weight, preferably from about 2% by weight to about 8% by weight, and more preferably from about 3% by weight to about 7% by weight, based upon the total weight of the composition taken as 100% by weight.

In another embodiment, the flowable composition is a hybrid composition comprising both FRPMs such as acrylates, methacrylates, ethylenically unsaturated compounds, and mixtures thereof; and cationic polymerizable monomers (CPMs) such as epoxies, vinyl ethers, oxiranes, oxetanes, polyols, and mixture thereof. The hybrid composition also comprises a photoinitiator. Even more preferably, the hybrid composition comprises at least two photoinitiators: one for initiating free radical polymerization and one for initiating cationic polymerization.

The FRPMs are present in the composition at levels of from about 5% by weight to about 95% by weight, preferably from about 10% by weight to about 80% by weight, and more preferably from about 50% by weight to about 70% by weight, based upon the total weight of the composition taken as 100% by weight. The CPMs are present in the composition at levels of from about 5% by weight to about 95% by weight, preferably from about 10% by weight to about 80% by weight, and more preferably from about 35% by weight to about 75% by weight, based upon the total weight of the composition taken as 100% by weight. The total photoinitiator is preferably the same as those discussed above with respect to the metal oxide composition. The free radical photoinitiator is present in the composition at levels of from about 1% by weight to about 10% by weight, preferably from about 2% by weight to about 8% by weight, and more preferably from about 3% by weight to about 7% by weight, while the cationic photoinitiator is present in the composition at levels of from about 1% by weight to about 10% by weight, preferably from about 2% by weight to about 8% by weight, and more preferably from about 3% by weight to about 7% by weight, based upon the total weight of the composition taken as 100% by weight. Preferred cationic photoinitiators include those selected from the group consisting of dyaryliodonium, triarylsulfonium, triarylsulfoxonium, dialkylhydroxyphenylsulfonium, ferrocenium salts, and diazonium salts.

This hybrid embodiment preferably also comprises a VOC-exempt solvent. As used herein, a VOC compound or solvent means one of carbon (excluding carbon monoxide, carbon dioxide, carbonic acid, metallic carbides or carbonates, and ammonium carbonate) that participates in atmospheric photochemical reactions. VOC-exempt solvents are those that have negligible or no photochemical activity and are defined in 40 C.F.R. 51.100(s)(1), incorporated by reference herein. Preferred VOC-exempt solvents for use in the present invention include those selected from the group consisting of dimethyl carbonate, acetone, methyl acetate, p-chlorobenzotrifluoride, propylene carbonate, t-butyl acetate, and mixtures thereof. When a VOC-exempt solvent is utilized, it is preferably present at levels of from about 10% by weight to about 30% by weight, more preferably from about 12% by weight to about 25% by weight, and even more preferably from about 15% by weight to about 20% by weight, based upon the total weight of the composition taken as 100% by weight. The hybrid composition can also comprise silica or alumina nanoparticles in the sizes and quantities discussed above with respect to the metal oxide composition.

In the third embodiment, the flowable composition is a polymeric composition comprising a polymer or oligomer and a photoinitiator dissolved or dispersed in a solvent system, with the polymer being selected from the group consisting of epoxies, polyurethanes, acrylates, and mixtures thereof. In this embodiment, the polymer or oligomer is present at levels of from about 60% by weight to about 95% by weight, preferably from about 50% by weight to about 80% by weight, and more preferably from about 60% by weight to about 75% by weight, based upon the total weight of the composition taken as 100% by weight. The photoinitiator is present at levels that are the same as those discussed above with respect to the metal oxide composition, with the preferred photoinitiator being a sulfonium or diazonium salt. In this embodiment, the solvent system comprises only VOC-exempt solvents such as those listed above, and in the same quantities as in the hybrid embodiment of the composition. The polymeric composition can also comprise silica or alumina nanoparticles in the sizes and quantities discussed above with respect to the metal oxide composition.

In instances where the polymeric composition comprises a polyurethane, water is typically included as a solvent. In such cases, the water is present at levels of from about 5% by weight to about 80% by weight, preferably from about 10% by weight to about 60% by weight, and more preferably from about 30% by weight to about 50% by weight, based upon the total weight of the composition taken as 100% by weight.

Regardless of which of the three embodiments above are utilized, they can be provided as thiol-containing or thiol-free. In the former, a source of thiols is included in the composition, with the thiols being useful as an oxygen scavenger, thus preventing the oxygen from inhibiting polymerization within the composition. Suitable sources of thiols include those selected from the group consisting of pentaerythritol tetra-(3-mercaptopropionate), trimethylolpropane tri-(3-mercaptopropionate), glycol di-(3-mercaptopropionate), pentaerythritol tetramercaptoacetate, trimethylolpropane trimercaptoacetate, glycol dimercaptoacetate, ethoxylated trimethylpropane tri(3-mercapto-propionate), and propylene glycol 3-mercaptopropionate.

In such instances, the source of thiols is preferably included in sufficient amounts to provide from about 1% by weight to about 10% by weight thiols, preferably from about 2% by weight to about 8% by weight thiols, and more preferably from about 3% by weight to about 5% by weight thiols, based upon the total weight of the composition taken as 100% by weight. In the thiol-free aspects, the flowable composition is essentially free of thiols. That is, the flowable composition comprises less than about 1% by weight thiols, preferably less than about 0.1% by weight thiols, and more preferably about 0% by weight thiols, based upon the total weight of the composition taken as 100% by weight.

The flowable compositions can also include various optional ingredients. Such ingredients include those selected from the group consisting of adhesion promoters, leveling agents, metal oxides, waxes, surfactants, photosensitizers, antifoaming agent, oxygen inhibition offsetting additives, and mixtures of the foregoing. When utilized, they are present in the following amounts:

| INGREDIENT | BROADEST[A] | PREFERRED[A] |
| --- | --- | --- |
| adhesion promoter | about 0 to about 5% | about 0.1 to about 1% |
| leveling agents | about 0.01 to about 3% | about 0.04 to about 0.8% |
| metal oxides | about 0.01 to about 50% | about 2 to about 45% |
| waxes | about 0 to about 5% | about 0.05 to about 2% |
| surfactants | about 0.01 to about 3% | about 0.05 to about 0.6% |
| photosensitizers[B] | about 1 to about 10% | about 2 to about 5% |
| antifoaming agent | about 0.01 to about 3% | about 0.05 to about 0.7% |
| oxygen inhibition offsetting additives[C] | about 1 to about 10% | about 0.1 to about 5% |

[A] based upon the total weight of the composition taken as 100% by weight.
[B] Such as anthracene, thioxanthone, naphthalene, perylene, pyrene, or phenothiazine.
[C] Such as multifunctional mercapto compounds (e.g., polythiols) or amino-containing compounds such as aminofunctional acrylates.

Furthermore, regardless of the embodiment, the flowable composition has a low viscosity. That is, the composition will have a viscosity of less than about 500 cP, preferably less than about 400 cP, more preferably less than about 200 cP, and even more preferably from about 1 cP to about 200 cP. As used herein, viscosity is determined by a Brookfield LVDV+II Pro Viscometer at 22° C.

Additionally, while the flowable composition may or may not comprise a VOC-exempt solvent, as discussed above, it will comprise little to no VOCs. That is, the composition will preferably comprise less than about 5% by weight VOCs, more preferably less than about 1% by weight VOCs, and even more preferably about 0% by weight VOCs, based upon the total weight of the composition taken as 100% by weight.

Finally, in another embodiment, the composition is free of amines. That is, the composition will comprise less than about 5% by weight amine groups, preferably less than about 1% by weight amine groups, and more preferably about 0% by weight amine groups, based upon the total weight of the composition taken as 100% by weight.

In use, the flowable composition is applied to the particular surface to be protected by any conventional application method. For example, the composition can be sprayed onto the surface, brushed onto the surface, or pulled with a squeegee. Other suitable methods include dip-coating, silk-screening, and application with a roller. The composition can be applied directly to the surface, or to a primer layer (e.g., adhesion promoting layer) on the surface. Typical surfaces that might be protected with the inventive coatings include those selected from the group consisting of high pressure decorative laminate surface (such as a synthetic bowling lane surface) as well as wooden and plastic surfaces. Specific additional examples include vinyl composite tile flooring, hardwood flooring, and laminate flooring.

Once a layer of the composition is applied to the surface, it is exposed to UV LED light. That is, the layer is exposed to light having a wavelength of from about 320 nm to about 700 nm, preferably from about 350 nm to about 500 nm, and more preferably from about 365 nm to about 420 nm, to form a cured coating. Any commercially available or custom-made UV LEDs can be used. Powerful UV LEDs are available from the companies such as Phoseon Technology (Hillsboro, Oreg.), Hamamatsu Corporation (Bridgewater, N.J.), UV Process Supply, Inc. (Chicago, Ill.), Clearstone Technologies Inc. (Minneapolis, Minn.), Heraeus Noblelight LLC (Buford, Ga.), and LEDs Masters (Guangdong China (Mainland)). In some embodiments, the light source could be one selected from the group consisting of xenon lamps, helium lamps, and some low-energy mercury lamps.

The light exposure activates the photoinitiator, causing polymerization to occur in embodiments where polymerizable monomers are present. The polymers will preferably also crosslink during this process, whether they are polymers that were newly formed during light exposure, or whether they were added as polymers when preparing the composition (e.g., in the polyurethane embodiments). This curing process will result in a coating having an average thickness (an average taken over 5 measurements) of from about 2 μm to about 200 μm, and more preferably from about 3 μm to about 100 μm. It will be appreciated that the present invention provides significant benefits over the prior art in that the inventive compositions cure successfully in the presence of oxygen in ambient conditions without partial or complete inert gas (nitrogen, carbon dioxide) blanketing.

Advantageously, the cured coating will have a number of desirable properties. For example, when subjected to an abrasion test as defined herein, the coatings will have a ΔHaze of less than about 30, preferably less than about 20, and more preferably from about 0 to about 10. They will also have a coefficient of friction of less than about 0.8, preferably less than about 0.29, and more preferably from about 0.08 to about 0.20.

The coatings will also have an adhesion of at least about 90%, preferably at least about 95%, and more preferably about 100%. The impact resistance of the coatings will be at least about 140 inch-lb, preferably at least about 150 inch-lb, and more preferably at least about 160 inch-lb. Finally, the Sward hardness of the coating will be from about 30 to about 55, and preferably from about 35 to about 50.

EXAMPLES

The following examples set forth preferred methods in accordance with the invention. It is to be understood, however, that these examples are provided by way of illustration and nothing therein should be taken as a limitation upon the overall scope of the invention.

Testing Procedures

1. Abrasion

A sample of the particular mixed coating was applied to a polyethylene terephthalate (PET) film using differently sized wire rods. The coating was cured with a UV LED light source: 4 W/cm$^2$ 395 nm air cooled RX Firefly light source from Phoseon Technology (Hillsboro, Oreg.). Curing took place at a speed of 10 fpm at a distance of 5 mm from the LED surface.

Abrasion was tested with a TABER® Rotary Platform Abrasion Tester. The coating was subjected to a 100 cycles with 500 g load and CS-10F wheels. Haze of the coating was determined before and after the abrasion, and the change in haze (ΔHaze) was recorded.

2. Scratch

Samples were prepared exactly as described in Part 1 above for the Abrasion test. The Scratch test was performed with a 000 steel wool, 20 rubs with no weight applied. The results were inspected visually.

3. Adhesion

Samples were prepared exactly as described in Part 1 above for the Abrasion test, except that the coating was applied to a synthetic bowling lane. Adhesion was tested by the method described in ASTM DD3359.

4. Impact Resistance

Samples were prepared exactly as described in Part 1 above for the Abrasion test, except that the coating was applied to a synthetic bowling lane. Impact Resistance was tested with a Taber Heavy Duty Impact Tester by following ASTM D2794, D3029, and D4226.

5. Coefficient of Friction

Samples were prepared exactly as described in Part 1 above for the Abrasion test, except that the coating was applied to a synthetic bowling lane. The Coefficient of Friction was then tested according the test specified for synthetic bowling lane surface in the USBC manual. This method was designed for determining the coefficient of friction of a bowling lane surface using a weighted sled with urethane feet. In the method, the force needed to slide a sled with a total weight of 14 pounds across a coated synthetic lane surface at a speed of about 0.5 feet per second was measured. The lane sample was cleaned thoroughly with isopropyl alcohol and allowed to dry completely. The sample was then pre-treated by applying a heavy layer of lane conditioner and allowed to saturate for a total of 72 hours. The sample was then cleaned thoroughly with isopropyl alcohol to remove all lane conditioner from the surface of the sample. Next, the force was measured. The resulting force was then divided by 14 lb weigh to calculate the kinetic coefficient of friction.

6. Sward Hardness

Sward hardness is the surface hardness of a material measured by a rocker device such as Gardner/Sward Hardness Rocker. The hardness value was obtained from the damping of the oscillation of the rocker, which is proportional to the hardness of the material.

The sward hardness rocker was placed on a flat, completely dry and clean, leveled synthetic lane surface sample. The instrument was rotated to between 25 to 27 degrees from its "at rest" position, and then the rocker was released. As soon as the swing amplitude decayed to the high set limit of approximately 22 degrees, the counter automatically started registering each swing cycle and continued to do so until the swing amplitude dropped below the low set limit of approximately 16 degrees. The average of the several readings multiplied by 2 gave the hardness value.

Coating Formulation Preparation

In each instance, the components of the coating composition were mixed in ambient conditions with light exposure kept to a minimum. Polyethylene containers were used for mixing, which was accomplished with a laboratory mixer equipped with a stainless steel blade. The following Examples and accompanying tables set forth the various formulations that were tested.

Example 1

100% Solids UV LED Curable Formulation with Thiols

Example 1.1

| COMPONENT | WEIGHT % |
|---|---|
| Nanocryl C-145 (50 wt. % silica nanoparticles in tripropylene glycol diacrylate, Nanophase Technologies, Romeoville, IL) | 68.1 |
| Sartomer CD 595 (acrylate ester, Sartomer USA, LLC, Exton, PA) | 17 |
| TEGO Flow 370 (acrylate-based flow/leveling agent, Evonik Tego Chemie GmbH, Essen Germany) | 0.6 |
| Sartomer CD9053 (adhesion promoter, trifunctional acid ester, Sartomer USA) | 4.3 |
| Thiocure TMPMP (trimethylolpropane tri-3-mercaptopropionate, Evans Chemetics Inc., Waterloo, NY) | 4.3 |
| Chivacure TPO (2,4,6-trimethylbenzoyldiphenylphosphine oxide; photoinitiator, Chitec Technologies, Taiwan) | 2.8 |
| Irgacure 819 (bis (2,4,6-trimethylbenzoyl)-phenylphosphine-oxide; photoinitiator, BASF) | 2.8 |
| Effka 3883 (a polysiloxane modified-polymer terminated by unsaturated groups; leveling agent, BASF) | 0.1 |

Example 1.2

| COMPONENT | WEIGHT % |
|---|---|
| Nanocryl C-145 | 67.5 |
| SR 306F (tripropylene glycol diacrylate, Sartomer) | 17.0 |
| Irgacure 819 | 4.1 |

-continued

| COMPONENT | WEIGHT % |
|---|---|
| Darocur TPO (2,4,6-trimethylbenzoyldiphenylphosphine oxide; photoinitiator, BASF) | 1.4 |
| Thiocure TMPMP | 4.75 |
| Sartomer CD9053 | 4.5 |
| TEGO Flow 370 | 0.75 |

Example 1.3

| COMPONENT | WEIGHT % |
|---|---|
| Nanocryl C-140 (50 wt. % silica in difunctional acrylate monomers, Evonik, Germany) | 67.0 |
| SR 306F | 17.5 |
| Irgacure 819 | 4.1 |
| Darocure TPO | 1.4 |
| Thiocure TMPMP | 4.75 |
| Sartomer CD9053 | 4.5 |
| TEGO Flow 370 | 0.75 |

Example 1.4

| COMPONENT | WEIGHT % |
|---|---|
| Nanocryl C-145 | 68.6 |
| Irgacure 819 | 1.4 |
| Darocure TPO | 4.1 |
| Sartomer CD595 | 17 |
| Thiocure TMPMP | 4.3 |
| Sartomer CD9053 | 4.3 |
| TEGO Flow 370 | 0.3 |

Example 1.5

| COMPONENT | WEIGHT % |
|---|---|
| Nanocryl C-145 | 64.6 |
| Irgacure 819 | 1.4 |
| Darocure TPO | 4.1 |
| Sartomer CD595 | 17 |
| Thiocure TMPMP | 4.3 |
| Sartomer CD9053 | 4.3 |
| TEGO Flow 370 | 0.3 |
| Aluminum Oxide, 250 nm (55 wt. % Al$_2$O$_3$ in tripropylene glycol diacrylate, Nanophase Technologies) | 4.0 |

Example 1.6

| COMPONENT | WEIGHT % |
|---|---|
| Nanocryl C-140 | 67.8 |
| Darocure TPO | 3.5 |
| Irgacure 819 | 1.1 |
| TEGO Flow 370 | 0.5 |
| Polyfluo 523 XF (polyethylene waxes with PTFE, Micro Powders, Inc., NY) | 1.7 |
| Sartomer CD9053 | 4.2 |
| Thiocure TMPMP | 4.2 |
| Sartomer SR306 | 17 |

Example 1.7

| COMPONENT | WEIGHT % |
|---|---|
| Nanocryl C-140 | 67.8 |
| Darocure TPO | 3.5 |
| Irgacure 819 | 1.1 |
| TEGO Flow 370 | 0.5 |
| Polyfluo 523 XF | 1.7 |
| Sartomer CD9053 | 4.2 |
| Thiocure TMPMP | 4.2 |
| SR238 (1,6 hexanediol diacrylate, Sartomer) | 17 |

Example 1.8

| COMPONENT | WEIGHT % |
|---|---|
| Nanocryl C-140 | 64.7 |
| Aluminum Oxide, 40 nm (30 wt. % Al$_2$O$_3$ in tripropylene glycol diacrylate, Nanophase Technologies) | 2.5 |
| Irgacure 819 | 1.35 |
| Darocure TPO | 4 |
| SR 238 | 17 |
| Thiocure TMPMP | 4.2 |
| Sartomer CD9053 | 4.2 |
| Ceridust 5091 (wax; Ester of pentaeryhtrite, motanic acids, and acrylic acid, Clariant) | 1.6 |
| TEGO Flow 370 | 0.45 |

Example 2

100% Solids UV LED Curable Formulation without Thiols

Example 2.1

| COMPONENT | WEIGHT % |
|---|---|
| Nanocryl C-140 | 82.3 |
| Sartomer CD9053 | 11 |
| Chivacure TPO | 2.7 |
| Irgacure 819 | 3.9 |
| Effka 3883 | 0.1 |

Example 2.2

| COMPONENT | WEIGHT % |
|---|---|
| Nanocryl C-153 (50 pbw silica nanoparticles in ethoxylated trimethylolpropantriacrylate, Evonik, Germany) | 86 |
| Sartomer CD9053 | 10 |
| Irgacure 819 | 3.8 |
| TEGO Flow 370 | 0.2 |

Example 2.3

| COMPONENT | WEIGHT % |
|---|---|
| Nanocryl C-153 | 50 |
| Nanocryl C-140 | 36 |
| Sartomer CD9053 | 10 |
| Irgacure 819 | 3.8 |
| TEGO Flow 370 | 0.2 |

Example 3

VOC-Exempt Solvent Diluted Formulation with Thiols

Example 3.1

| COMPONENT | WEIGHT % |
|---|---|
| Sartomer CN 112C60 (epoxy novolak acrylate blended with 40% trimethylolpropane triacrylate, Sartomer) | 27.2 |
| Sartomer SR444 (pentaerythritol triacrylate, Sartomer) | 13.6 |
| Nanocryl C-150 (50 wt. % silica nanoparticles in trimethylol-propane triacrylate, Nanophase Technologies) | 13.6 |
| Sartomer SR399 (dipentaerythritol pentaacrylate, Sartomer) | 13.6 |
| Sartomer CD9053 | 3.4 |
| Chivacure TPO | 2.2 |
| Irgacure 819 | 2.2 |
| TEGO Flow 370 | 0.7 |
| Thiocure TMPMP | 3.4 |
| BYK UV 3500 (polyether modified acryl functional poly-dimethylsiloxane, BYK, Germany) | 0.1 |
| VOC-Exempt Solvent (Dimethylcarbonate, from Special Material Company, Lakeworth, FL) | 20 |

Example 3.2

| COMPONENT | WEIGHT % |
|---|---|
| CN9890 (melamine acrylate, Sartomer) | 20.0 |
| SR 351 (trimethylolpropane triacrylate, Sartomer) | 16.0 |
| Nanocryl C-150 | 16.0 |
| SR 454 (ethoxylated trimethylolpropane triacrylate, Sartomer) | 11.0 |
| SR 9003 (propoxylated(2) neopentyl glycol diacrylate, Sartomer) | 16.0 |
| Sartomer CD 9053 | 4.0 |
| Thiol | 3.4 |
| Darocure TPO | 5.3 |
| TEGO Flow 370 | 0.3 |
| VOC exempt solvent (dimethylcarbonate) | 8.0 |

Example 3.3

| COMPONENT | WEIGHT % |
|---|---|
| SR 399 (low viscosity dipentaerythritol pentacrylate, Sartomer) | 21 |
| SR351 | 16.75 |
| Nanocryl C-150 | 16.75 |
| SR 454 | 12.5 |
| SR 9003 | 8.3 |
| Ebecryl P115 (photactivator, copolymerizable amine, Cytec, NJ) | 8.3 |
| Darocure TPO | 5.8 |
| TEGO Flow 370 | 0.4 |
| VOC exempt solvent (dimethylcarbonate) | 10.2 |

Example 3.4

| COMPONENT | WEIGHT % |
|---|---|
| SR 399 | 20.0 |
| SR351 | 16.1 |
| Nanocryl C-150 | 16.1 |
| SR 454 | 12.0 |
| SR 9003 | 16.1 |
| Irgacure 819 | 5.1 |
| TEGO Flow 370 | 0.4 |
| Sartomer CD 9054 (trifunctional acid ester) | 4.0 |
| VOC Exempt Solvent (dimethylcarbonate) | 10.2 |

Example 3.5

| COMPONENT | WEIGHT % |
|---|---|
| Sartomer CD595 | 7.6 |
| CN9890 | 39.3 |
| Nanocryl C-165 (50 pbw silica nanoparticles in propoxylated pentaerythritoletrarylate, Nanocryl) | 39.3 |
| Thiocure TMPMP | 4 |
| Sartomer CD9053 | 4 |
| MASURF FS-2000 (nonionic fluoroaliphatic polymer fluorosurfactant, Mason Chemical Company, IL) | 0.01 |
| TEGO Flow 370 | 0.39 |
| Irgacure 819 | 1.3 |
| Darocure TPO | 4.1 |

Example 4

VOC-Exempt Solvent Diluted Formulation without Thiols

| COMPONENT | WEIGHT % |
|---|---|
| Nanocryl C-153 | 70 |
| Sartomer CD9053 | 9 |
| Irgacure 819 | 3.8 |
| Acetone | 17 |
| TEGO Flow 370 | 0.2 |

Example 5

Influence of Thiol Levels on Properties of Cured Coatings

The formulation of Example 3.1 was prepared multiple times, but with varying amounts of Thiocure TMPMP, so that the impact of thiols on the coating could be analyzed. See Table A.

TABLE A

Solvent-Based UV LED Bowling Lane Finish

| % THIOL[A] | COEFFICIENT OF FRICTION | SCRATCH[B] | ΔHAZE (ABRASION) |
|---|---|---|---|
| 0 | 0.36 | 4 | 15.1 |
| 0.15 | 0.34 | 2-3 | 12.9 |
| 0.35 | 0.33 | 2-3 | 14.9 |
| 0.6 | 0.33 | 3 | 13.2 |
| 1.2 | 0.28 | 0.5-1 | 14.6 |
| 2.4 | 0.29 | 0.25 | 12.2 |
| 3.5 | 0.305 | 0 | 13.5 |
| 5 | 0.35 | 0 | 12.4 |
| 10 | 0.36 | 0 | 12.8 |

[A]Based upon weight of resins.
[B]Where 5 is worst, and 0 is best (i.e., no scratches).

Next, the formulation of Example 1.1 was prepared multiple times, but with varying amounts of Thiocure TMPMP, so that the impact of thiols on the coating could be analyzed. See Table B.

TABLE B

100% Solids UV LED Bowling Lane Finish

| % THIOL[A] | COEFFICIENT OF FRICTION | SCRATCH[B] | ΔHAZE (ABRASION) |
|---|---|---|---|
| 0 | 0.38 | 2 | 8.0 |
| 0.5 | 0.40 | 0.5 | 7.8 |
| 1 | 0.38 | 0-0.25 | 8.2 |
| 1.5 | 0.36 | 0 | 5.6 |
| 2.5 | 0.35 | 0 | 5.9 |
| 5 | 0.39 | 0 | 6.0 |
| 10 | 0.40 | 0 | 5.9 |

[A]Based upon weight of resins.
[B]Where 5 is worst, and 0 is best (i.e., no scratches).

The results from Tables A-B demonstrate that the scratch resistance of the coating depends significantly on the amount of the added thiol. The solvent-borne formulation required at least 3.5% of thiol in order to achieve sufficient scratch resistance, while a solvent-free formulation required only 1.5%.

The impact on abrasion resistance was not as dramatic, but the abrasion resistance continually improved with the increase in thiol concentration.

There was also an effect on the coefficient of friction by the addition of thiol. The coefficient of friction decreased with lower concentrations of thiol until the full cure of the surface of the coating is achieved. After that, the coefficient of friction increased with further increases in thiol concentration.

The presence of thiols can make the formulations unstable since oxygen inhibition of spontaneous polymerization is absent in this case. At concentrations of thiol above 10% the formulations tend to become very unstable. Solvent-free formulations gel almost instantly in these instances. The shelf life of the solvent-borne coating formulation is more than 6 months in a glass container. The shelf life of a 100% solids formulation depends on its composition, but is generally much shorter than that of a solvent-borne composition.

Example 6

Hybrid Coating Formulation

Example 6.1

| COMPONENT | WEIGHT % |
|---|---|
| Erisys GE-30 (trimethylolpropane triglycidyl ether, CVC Specialty Chemicals) | 25.5 |
| Nanopox C-680 (3,3,5,5-tetramethyl-1-pyrolline-N-oxide, colloidal silica sols in epoxy resins, Evonik, Germany) | 25.5 |
| Sartomer CN112C60 | 11 |
| Sartomer SR 399 | 11 |
| Dimethyl Carbonate | 22 |
| Irgacure 819 | 1.5 |
| Aceto 6976 (4-thiophenyl phenyl diphenyl sulfonium hexafluoroantimonate; cationic photoinitiator, Aceto Corp, Germany) | 1.5 |
| Chivacure DETX (photosensitizer; 2,4-diethylthioxanthone, Chitec) | 1.5 |
| TEGO Flow 370 | 0.4 |
| BYK UV 3500 | 0.1 |

Example 6.2

| COMPONENT | WEIGHT % |
|---|---|
| Erisys GE-30 | 38.4 |
| Nanopox C-680 | 33.8 |
| Sartomer CN112C60 | 10.0 |
| Sartomer SR399 | 10.0 |
| Aceto 6976 | 3.3 |
| DETX | 3.3 |
| Irgacure 819 | 1.2 |

Example 6.3

| COMPONENT | WEIGHT % |
|---|---|
| Erisys GE-30 | 32.5 |
| Nanopox C-680 | 28.7 |

-continued

| COMPONENT | WEIGHT % |
|---|---|
| Sartomer CN112C60 | 15 |
| Sartomer SR399 | 16.6 |
| Aceto PI 6976 | 2.6 |
| DETX | 2.6 |
| Irgacure 819 | 2 |

Example 6.4

| COMPONENT | WEIGHT % |
|---|---|
| Erisys GE-30 | 45.5 |
| Beckopox EP 147 (Bisphenol A/F liquid epoxy resin containing crosslinkable emulsifiers, Cytec, NJ) | 19.2 |
| Nanocryl C-150 | 18.3 |
| Sartomer CN112C60 | 9 |
| DETX | 3 |
| Aceto PI 6976 | 3 |
| Irgacure 819 | 2 |

Example 7

Epoxy Formulation

Example 7.1

| COMPONENT | WEIGHT % |
|---|---|
| Erisys GE-30 | 29 |
| Nanopox C-680 | 29 |
| Dimethylcarbonate | 36 |
| Aceto PI 6976 | 2.8 |
| DETX | 2.5 |
| TEGO Flow 370 | 0.7 |

Example 7.2

| COMPONENT | WEIGHT % |
|---|---|
| Erisys GE-30 | 30.7 |
| Nanopox 680 | 30.7 |
| VOC-exempt solvent (dimethyl carbonate) | 30.7 |
| Aceto PI 6976 | 3.1 |
| DETX | 3.7 |
| TEGO Flow 370 | 0.47 |
| Chartwell 515-71 HR (amino-functional, metal organic adhesion promoter in propylene glycol, Chartwell International, MA) | 0.6 |
| Capstone 62AL (3,3,4,4,5,5,6,6,7,7,8,8,8-tridecafluoro-1-octanol, DuPont) | 0.03 |

Example 7.3

| COMPONENT | WEIGHT % |
|---|---|
| Erisys GE-31 (aliphatic trifunctional epoxy diluent; trimethylolethane triglycidyl ether, CVC Specialty Chemicals) | 30.8 |
| Nanopox 680 | 30.8 |
| VOC-exempt solvent (dimethyl carbonate) | 30.8 |
| Aceto PI 6976 | 3.2 |
| DETX | 3.8 |
| TEGO Flow 370 | 0.6 |

Example 7.4

| COMPONENT | WEIGHT % |
|---|---|
| Erisys GE-60 (an aliphatic polyfunctional epoxy resin; sorbitol glycidyl ether, CVC Specialty Chemicals) | 30.8 |
| Nanopox 680 | 30.8 |
| VOC-exempt Solvent (dimethyl carbonate) | 30.8 |
| Aceto PI 6976 | 3.2 |
| DETX | 3.8 |
| TEGO Flow 370 | 0.6 |

Example 7.5

| COMPONENT | WEIGHT % |
|---|---|
| Erisys GE-60 | 10 |
| Erisys GE-30 | 10 |
| Erisys GE-31 | 10 |
| Nanopox 680 | 31.6 |
| VOC-exempt Solvent (dimethyl carbonate) | 31 |
| Aceto 6976 | 3.1 |
| DETX | 3.7 |
| TEGO Flow 370 | 0.6 |

Example 8

UV Curable Polyurethane Dispersion

Example 8.1

| COMPONENT | WEIGHT % |
|---|---|
| Bayhydrol UV XP 2689 (anionic polyurethane dispersion, Bayer) | 81 |
| DETX (10% in solvent) | 12 |
| Irgacure 819WD | 2.4 |
| Ebecryl P115 | 0.6 |
| Michem Lube 190 (anionic polyethylene wax emulsion, Michelman, OH) | 4 |

Example 8.2

| Component | WEIGHT % |
| --- | --- |
| Ucecoat 7699 (acrylated polyurethane dispersion, Cytec, NJ) | 83.4 |
| DETX (10% in solvent) | 8 |
| Darocure TPO (10% in solvent) | 4 |
| Ebecryl P115 | 0.6 |
| Irgacure 819 | 4 |

Example 8.3

| Component | WEIGHT % |
| --- | --- |
| Ucecoat 7710 (polyurethane dispersion, Cytec, NJ) | 85 |
| DETX (10% in solvent) | 8 |
| Darocure TPO (10% in solvent) | 4 |
| Ebecryl P115 | 0.6 |
| Irgacure 819 | 4 |

Example 9

Comparison of the Sward Hardness of the Coating

Table C provides the sward hardness ranges of the coatings from Examples 1-5.

TABLE C

| Coating type | Sward Hardness |
| --- | --- |
| 100% solids, Example 1 | 40-48 |
| Solvent-based, Example 2 | 40-50 |
| Hybrid coating, Example 6 | 28-40 |
| Epoxy coating, Example 7 | 24-42 |
| UV PUD, Example 8 | 26-40 |

Example 10

Impact Resistance and Adhesion of Cured Coatings

The impact resistance of Examples 1-4 and 6-7 above were tested after coating onto a synthetic bowling lane surface (as described in the Testing Procedures section above), and all were above 160 inch-lb., which is the highest resistance level than can be measured with the Taber Heavy Duty Impact Tester.

The adhesion of Examples 1-4 and 6-8 above were tested, and all had a 95-100% retention of the coating on the test surface.

Example 11

Comparative Examples

The properties and performance of the inventive bowling lane finishes were compared to synthetic bowling lane surfaces. This surface is originally coated with a melamine-formaldehyde resin when manufactured. Melamine-formaldehyde resins are one of the hardest and toughest materials, and it is desirable for the inventive coating was to reach the performance numbers of this original material. A standard EN438/YSO4586 test that is commonly utilized in testing of HPDL surfaces was used.

S-42 abrasive strips on S0 rubber wheels with 500 g/arm weights were used in the Taber test. The number of cycles that was needed to completely remove the coating was recorded.

| SURFACE | NUMBER OF CYCLES |
| --- | --- |
| Edge Approach | 14,500 |
| Edge Lane | 10,000 |
| Brunswick Lane | 7,600 |
| Qubica AMF lane | 8,000 |
| Example 1: 100% solids coating | 10,000-16,000 |

The presented synthetic lane finish performance was compared to commercially available wood lane coatings as well. Abrasion resistance (the smaller the ΔHaze, the better the resistance), scratch resistance (0=best . . . 5=worst), and coefficient of friction were assessed as described above. Both wood lane coatings were urethane-based ones. Therefore, their properties were tested at least 10 days after coating application in order to let the material crosslink to full extent and acquire its final properties.

| Coating | Scratch | Coefficient of Friction | ΔHaze |
| --- | --- | --- | --- |
| Brunswick USP 300 | 4 | 0.211 | 29.0 |
| Brunswick Astrolane E-Z | 4 | 0.24 | 34.0 |
| Example 1.1: 100% solid coating | 0 | 0.25 | 5-10 |

These examples demonstrated that the 100% solids UV LED coating according to the invention surpassed many characteristics of commercially available wood lane coatings. Moreover, it achieved the performance of a very tough synthetic lane surface.

We claim:

1. A method of forming a coating on a surface, said method comprising:
   providing a flowable composition comprising
      a metal oxide composition comprising:
         silica nanoparticles, alumina nanoparticles, or both;
      an acrylate; and
      a photoinitiator selected from the group consisting of 2,4,6-trimethylbenzoyldiphenylphosphine oxide, bis (2,4,6-trimethylbenzoyl)-phenylphosphineoxide, 4-thiophenyl phenyl diphenyl sulfonium hexafluoroantimonate, 2-methyl-1-[4-(methylthio)-phenyl]-2-(4-morpholinyl)-1-propanone, and mixtures thereof;
   said flowable composition having a viscosity of less than about 200 cP and comprising less than about 5% by weight volatile organic compounds;
   applying a layer of said flowable composition to said surface; and
   exposing said layer to light having a wavelength of from about 320 nm to about 700 nm to form said coating.

2. The method of claim 1, wherein said flowable composition further comprises a source of thiols.

3. The method of claim 2, wherein said source of thiols is present at a level of from about 1% by weight to about 10% by weight thiols, based upon the total weight of the flowable composition taken as 100% by weight.

4. The method of claim 1, wherein said flowable composition is essentially free of thiols.

5. The method of claim 1, wherein said exposing causes polymerization of components in said flowable composition.

6. The method of claim 5, wherein said exposing causes crosslinking of polymers formed during said polymerization.

7. The method of claim 1, wherein said flowable composition comprises less than about 1% of volatile organic compounds.

8. The method of claim 1, wherein said coating, when subjected to an abrasion test, has a ΔHaze of less than about 30.

9. The method of claim 1, wherein said coating has a coefficient of friction of less than about 0.8.

10. The method of claim 1, wherein said coating has an adhesion of at least about 90%.

11. The method of claim 1, wherein said coating has an impact resistance of at least about 140 inch-lb.

12. The method of claim 1, wherein said acrylate is selected from the group consisting of acrylate esters, trimethylol propane triacrylate, 1,6-hexanediol acrylate, 1,6-hexanediol diacrylate, isobornyl acrylate, hexafunctional urethane acrylate, hexafunctional epoxy acrylate, tripropylene glycol diacrylate, epoxy novolak acrylate, ethoxylated trimethylolpropane triacrylate, pentaerythritol triacrylate, dipentaerythritol pentaacrylate, melamine acrylate, propoxylated neopentyl glycol diacrylate, and mixtures thereof.

13. The method of claim 1, wherein said photoinitiator is selected from the group consisting of 2,4,6-trimethylbenzoyldiphenylphosphine oxide, bis (2,4,6-trimethylbenzoyl)-phenylphosphineoxide, 4-thiophenyl phenyl diphenyl sulfonium hexafluoroantimonate, and mixtures thereof.

14. The method of claim 1, wherein said flowable composition further comprises an ingredient selected from the group consisting of adhesion promoters, leveling agents, metal oxides, waxes, surfactants, photosensitizers, antifoaming agent, oxygen inhibition offsetting additives, and mixtures of the foregoing.

15. The method of claim 1, wherein said surface is selected from the group consisting of bowling lanes, vinyl composite tile, hardwood flooring, and laminate flooring.

16. The method of claim 1, wherein said exposing is carried out with an LED light source.

17. A protected surface, said surface comprising a cured coating on said surface, said cured coating being formed from a flowable composition comprising
a metal oxide composition comprising:
silica nanoparticles, alumina nanoparticles, or both;
an acrylate; and
a photoinitiator selected from the group consisting of 2,4,6-trimethylbenzoyldiphenylphosphine oxide, bis (2,4,6-trimethylbenzoyl)-phenylphosphineoxide, 4-thiophenyl phenyl diphenyl sulfonium hexafluoroantimonate, 2-methyl-1-[4-(methylthio)-phenyl]-2-(4-morpholinyl)-1-propanone, and mixtures thereof;
said flowable composition having a viscosity of less than about 200 cP and comprising less than about 5% by weight volatile organic compounds, and being curable by light having a wavelength of from about 320 nm to about 700 nm.

18. The protected surface of claim 17, wherein said flowable composition further comprises a source of thiols.

19. The protected surface of claim 18, wherein said source of thiols is present at a level of from about 1% by weight to about 10% by weight thiols, based upon the total weight of the flowable composition taken as 100% by weight.

20. The protected surface of claim 17, wherein said flowable composition is essentially free of thiols.

21. The protected surface of claim 17, wherein said flowable composition comprises less than about 1% of volatile organic compounds.

22. The protected surface of claim 17, wherein said coating, when subjected to an abrasion test, has a ΔHaze of less than about 30.

23. The protected surface of claim 17, wherein said coating has a coefficient of friction of less than about 0.8.

24. The protected surface of claim 17, wherein said coating has an adhesion of at least about 90%.

25. The protected surface of claim 17, wherein said coating has an impact resistance of at least about 140 inch-lb.

26. A flowable composition useful for treating a surface, said flowable composition comprising
a metal oxide composition comprising:
silica nanoparticles, alumina nanoparticles, or both;
an acrylate; and
a photoinitiator selected from the group consisting of 2,4,6-trimethylbenzoyldiphenylphosphine oxide, bis (2,4,6-trimethylbenzoyl)-phenylphosphineoxide, 4-thiophenyl phenyl diphenyl sulfonium hexafluoroantimonate, 2-methyl-1-[4-(methylthio)-phenyl]-2-(4-morpholinyl)-1-propanone, and mixtures thereof;
said flowable composition having a viscosity of less than about 200 cP, comprising less than about 5% by weight volatile organic compounds, and being curable by light having a wavelength of from about 320 nm to about 700 nm.

27. The flowable composition of claim 26, wherein said flowable composition further comprises a source of thiols.

28. The flowable composition of claim 27, wherein said source of thiols is present at a level of from about 1% by weight to about 10% by weight thiols, based upon the total weight of the flowable composition taken as 100% by weight.

29. The flowable composition of claim 26, wherein said flowable composition is essentially free of thiols.

30. The flowable composition of claim 26, wherein said flowable composition comprises less than about 1% of volatile organic compounds.

31. The flowable composition of claim 26, wherein said acrylate is selected from the group consisting of acrylate esters, trimethylol propane triacrylate, 1,6-hexanediol acrylate, 1,6-hexanediol diacrylate, isobornyl acrylate, hexafunctional urethane acrylate, hexafunctional epoxy acrylate, tripropylene glycol diacrylate, epoxy novolak acrylate, ethoxylated trimethylolpropane triacrylate, pentaerythritol triacrylate, dipentaerythritol pentaacrylate, melamine acrylate, propoxylated neopentyl glycol diacrylate, and mixtures thereof.

32. The flowable composition of claim 26, wherein said photoinitiator is selected from the group consisting of 2,4,6-trimethylbenzoyldiphenylphosphine oxide, bis (2,4,6-trimethylbenzoyl)-phenylphosphineoxide, 4-thiophenyl phenyl diphenyl sulfonium hexafluoroantimonate, and mixtures thereof.

33. The flowable composition of claim 26, wherein said flowable composition further comprises an ingredient selected from the group consisting of adhesion promoters, leveling agents, metal oxides, waxes, surfactants, photosensitizers, antifoaming agent, oxygen inhibition offsetting additives, and mixtures of the foregoing.

34. The flowable composition of claim 26, wherein said flowable composition is curable by an LED light source.

35. The flowable composition of claim 26, said flowable composition being curable to form a coating having a ΔHaze of less than about 30.

36. The flowable composition of claim 26, said flowable composition being curable to form a coating having an adhesion of at least about 90%.

37. The flowable composition of claim 26, said flowable composition being curable to form a coating having an impact resistance of at least about 140 inch-lb.

38. The flowable composition of claim 26, wherein said flowable composition is free of amines.

\* \* \* \* \*